United States Patent [19]

Aittama et al.

[11] Patent Number: 5,111,858
[45] Date of Patent: May 12, 1992

[54] INTERENGAGEABLE PLASTIC FUEL FLANGE AND PLASTIC FILLER TUBE

[75] Inventors: Robert W. Aittama, Livonia; Francis E. Noggle, Rochester, both of Mich.

[73] Assignee: Ford Motor Company, Dearborn, Mich.

[21] Appl. No.: 632,576

[22] Filed: Dec. 24, 1990

[51] Int. Cl.⁵ .................... B65B 3/04; B60K 15/04
[52] U.S. Cl. .................... 141/312; 141/382; 141/383; 220/86.2; 285/921
[58] Field of Search ............ 280/834; 220/85 F, 86.2; 285/253, 423, 921; 141/312, 369, 370, 372, 374, 382, 383, 386, 368, 390, 392

[56] References Cited

U.S. PATENT DOCUMENTS

| | | | |
|---|---|---|---|
| 2,103,838 | 12/1937 | Bach | 285/71 |
| 2,254,924 | 9/1941 | Williams | 29/148.2 |
| 2,270,926 | 1/1942 | Briegel et al. | 285/193 |
| 2,832,130 | 4/1958 | Harvey | 29/453 |
| 3,214,511 | 10/1965 | Franklin | 174/153 |
| 3,951,438 | 4/1976 | Scales | 285/55 |
| 4,185,844 | 1/1980 | Hubbard et al. | 280/5 A |
| 4,266,577 | 5/1981 | Usui | 138/109 |
| 4,404,983 | 9/1983 | Scheurenbrand et al. | 137/74 |
| 4,462,620 | 7/1984 | Bambenek et al. | 285/162 |
| 4,525,011 | 6/1985 | Lumsden et al. | 285/328 |
| 4,629,220 | 12/1986 | Crusco | 285/238 |
| 4,718,568 | 1/1988 | Dal Palù | 220/86 R |
| 4,750,525 | 6/1988 | Vaughan | 138/89 |
| 4,783,897 | 11/1988 | Basnett | 92/161 |

FOREIGN PATENT DOCUMENTS

| | | | |
|---|---|---|---|
| 3123303 | 12/1982 | Fed. Rep. of Germany | 280/834 |
| 255532 | 12/1985 | Japan | 280/834 |
| 191428 | 8/1986 | Japan | 280/834 |
| 20719 | 1/1987 | Japan | 280/834 |
| 464623 | 12/1968 | Switzerland | 285/921 |

Primary Examiner—William A. Cuchlinski, Jr.
Assistant Examiner—W. Morris Worth
Attorney, Agent, or Firm—Damian Procari; Roger L. May

[57] ABSTRACT

A plastic filler tube for a fuel tank which includes an arrangement approximate one end thereof which is engageable with a fuel flange of a fuel tank. The filler tube can include an annular outer flange or a plurality of tabs which can engage a radially inwardly directed flange or set of tabs on the fuel flange.

9 Claims, 2 Drawing Sheets

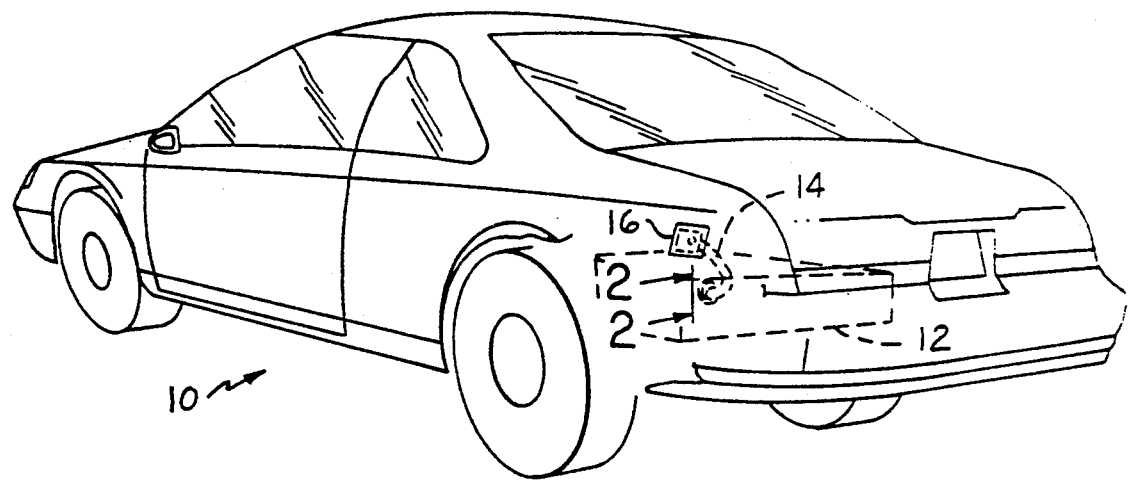
(PRIOR ART) FIG. 1
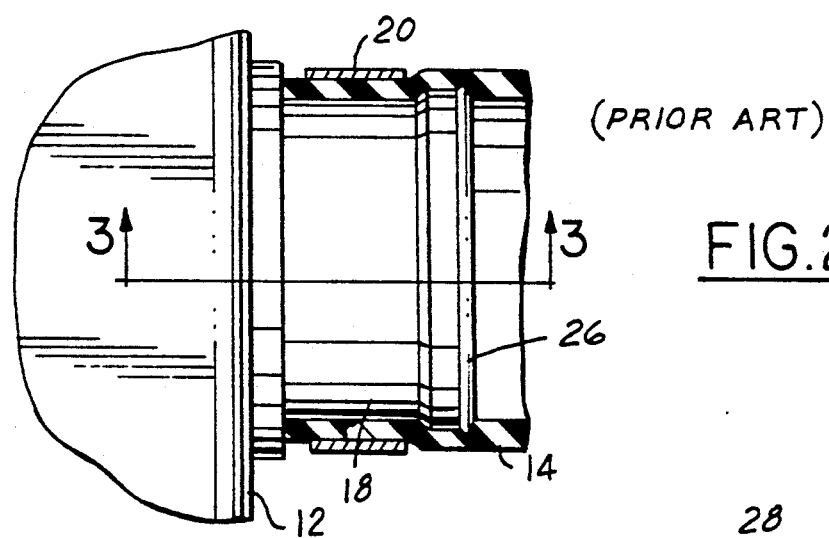
(PRIOR ART) FIG. 2
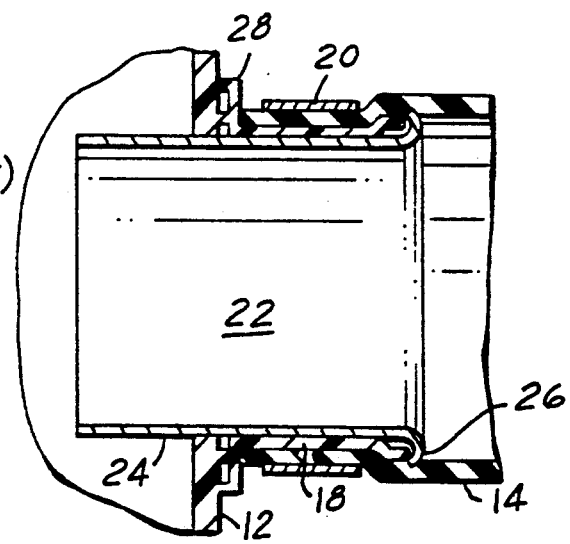
(PRIOR ART) FIG. 3

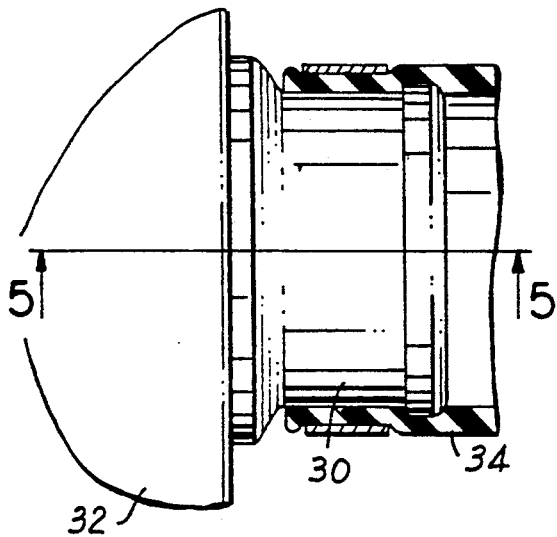
FIG.4
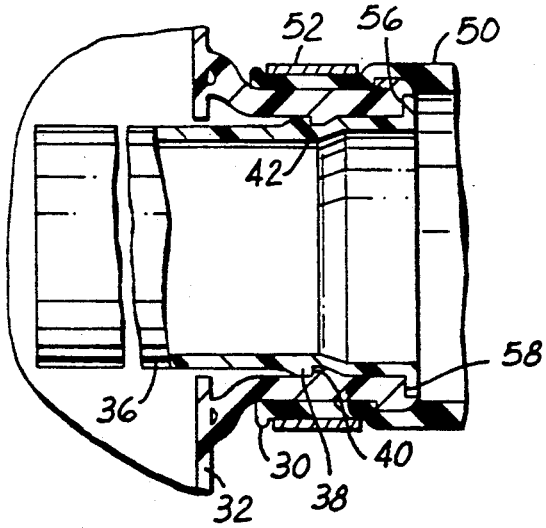
FIG.5
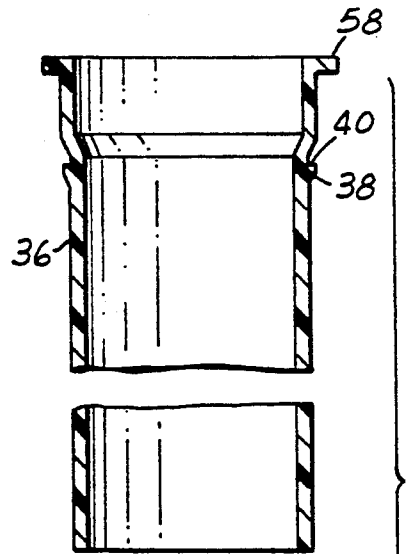
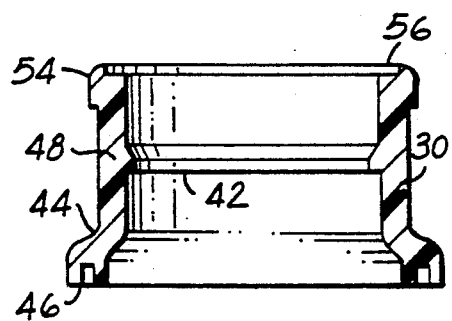
FIG.6
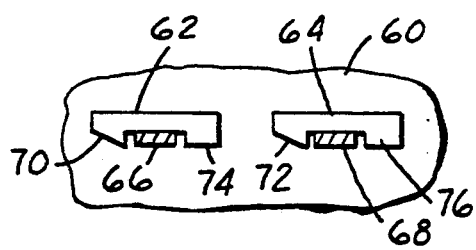
FIG.7
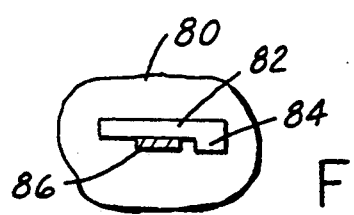
FIG.7A

INTERENGAGEABLE PLASTIC FUEL FLANGE AND PLASTIC FILLER TUBE

BACKGROUND OF THE INVENTION

1. Field of the Invention

The present invention relates to an interengageable fuel flange and filler tube for fuel tanks. More specifically, the present invention relates to an interengageable plastic fuel flange and filler tube combination which are engageable in a snap fit relation.

2. Discussion of the Related Art

Fuel tanks for transportation purposes have recently been designed from plastic materials because of their ability to be easily fabricated and because of their light weight nature.

In automotive uses in particular, the plastic fuel tank has an opening which is surrounded by a fuel flange. Into the fuel flange is received a filler tube which directs the fuel through the fuel flange and into the fuel tank. Attached on the outside of the fuel flange is a hose that is held in place on the fuel flange by a clamp mechanism and this hose connects up with the fuel door on the vehicle, thereby allowing fuel to be pumped to the tank.

In the Past, the plastic fuel tank included a rubber grommet in its opening and a metal tube press fit therein. This arrangement was modified so that a plastic fuel flange (containing a metal filler tube) could be heat welded to the plastic tank. Prior to welding the plastic fuel flange to the tank, the metal filler tube was assembled therein. The process for assembling the metal filler tube in the fuel flange included i) injection molding the plastic fuel flange and ii) jamming the metal filler tube into an abutting relation with the fuel flange, immediately after it comes out of the injection molder. The plastic fuel flange then cooled and caused a shrink fit between the two parts.

Static electricity may build on plastic parts from the flow of fuel over the plastic. Metal parts in direct contact with the plastic are generally grounded to the vehicle frame. Currently, this is done by contacting the edge of the metal filler tube with the conductive rubber tube that is grounded to the body. Thus, if any static charge develops, the charge is grounded to the body. This concern would not be an issue if metal was not used in the fuel fill system.

Metal filler tubes also have further problems. If it is necessary to change the length of the metal filler tube, the change in tooling is expensive. The metal parts are also expensive. Further, an untreated metal filler tube may rust in the system. It would, therefore, be advantageous to switch from a metal filler tube to a material which would not have the above-mentioned disadvantages. One material which has been considered as a substitute for a metal filler tube is plastic. Another, perhaps most important, reason why Plastic has never been used is because it was not known how to retain the plastic filler tube in the fuel flange and how to prevent it from moving axially relative thereto.

SUMMARY OF THE INVENTION

The present invention relates to a fuel tank filler tube which is plastic and includes a means proximate one end thereof which is engageable in snap fit relationship with the fuel flange of a fuel tank. More specifically, this means engageable with the fuel flange includes an annular flange that has a flat lip portion that extends transverse to the longitudinal axis of the filler tube. The filler tube is preferably made of ultra high density polyethylene.

The present invention further relates to the combination of the filler tube and the fuel flange wherein the fuel flange includes a first end Portion adaptable to be connected to a fuel tank and another portion substantially cylindrical in section attached to the first end portion and including an annular flange disposed on the inner surface thereof.

The annular flange of the fuel flange and the annular flange of the filler tube cooperate when connected to substantially prevent relative axial movement between the filler tube and the fuel flange whereby they cannot be pulled apart.

The fuel flange also includes a second end portion which includes a recessed abutment surface for receiving a flanged surface of the filler tube. This feature allows the fuel flange to protect the upper flange surface of the filler tube. This prevents the hose from catching on the flanged surface of the filler tube and pulling out the filler tube when the hose is removed.

The present invention also contemplates the use of a number of tabs on the filler tube and/or the fuel flange which interengage with the corresponding flange or tabs on the other part. Therefore, one continuous flange is not required.

The use of the plastic filler tube allows reduced costs over a metal filler tube. It also allows flexibility and eliminates the rust problem present previously. Additionally, the tooling costs for the plastic filler tube are decreased as compared to tooling cost for a metal filler tube.

Using a plastic filler tube allows great flexibility because different size filler tubes can be molded in different colors. Therefore, it is easy for an operator to recognize a specific size filler tube just by realizing which color should be used.

The invention also contemplates the use of different types of plastic being used for the filler tube and the fuel flange. In one embodiment, the filler tube can be an injection molded grade plastic and the fuel flange can be a blow molded grade plastic.

BRIEF DESCRIPTION OF THE DRAWINGS

FIG. 1 illustrates a perspective view of an automotive vehicle incorporating a fuel tank and the respective connections to the fuel door well known in the art.

FIG. 2 illustrates a partial cross-sectional view of a fuel tank taken along line 2—2 of FIG. 1, incorporating a plastic fuel flange and metal filler tube and conductive hose assembly known in the prior art.

FIG. 3 illustrates a cross-sectional view of the assembly shown in FIG. 2, taken along line 3—3, illustrating the metal filler tube extending over the plastic fuel flange and contacting the conductive hose as is known in the art.

FIG. 4 illustrates a partial cross-sectional view of a fuel tank assembly incorporating a plastic fuel filler tube according to the present invention.

FIG. 5 illustrates a cross-sectional view taken along line 5—5 of FIG. 4 showing the plastic filler tube in the assembled condition according to the present invention.

FIG. 6 illustrates the plastic fuel filler tube and the plastic fuel flange in an exploded view according to the present invention.

FIG. 7 illustrates the inner circumference of the fuel flange as a linear view showing an alternative embodiment of the engagement of tabs on the filler tube with specially shaped inwardly directed tabs on the fuel flange.

FIG. 7a illustrates a view similar to FIG. 7 showing another embodiment of the connection between the filler tube tab and the tabs on the fuel flange.

DETAILED DESCRIPTION OF THE PREFERRED EMBODIMENTS

FIG. 1 illustrates a perspective view of a vehicle 10 having a fuel tank 12 connected via a hose 14 to a fuel door 16. In this known system the fuel tank 12 is made of plastic and the hose 14 is a conductive rubber.

FIG. 2 illustrates an enlarged partial cross-sectional view of the connection between the hose 14 and the fuel tank 12. Specifically, the plastic fuel tank shown by reference numeral 12 includes a fuel flange 18 attached at an opening in the fuel tank 12. The hose 14 extends over an outer Portion of the fuel flange 18 and is secured thereto via a clamping mechanism 20.

FIG. 3 illustrates the cross-sectional view taken along line 3—3 in FIG. 2 and clearly illustrates a metal filler tube 22 having a portion 24 which extends into the interior of the fuel tank 12 and limits the amount of fuel filled in the tank 12. The metal filler tube 22 also includes a lip 26 which extends over the fuel flange 18 and prevents the metal filler tube from falling into the fuel tank 12. The lip 26 also contacts the hose 14 thereby grounding the metal to the body through the conductive rubber material of hose 14.

The fuel flange is attached to the tank 12 via circular feet 28 which are heat welded thereto. This process is well known to those skilled in the art.

FIG. 4 illustrates the connection between a fuel flange 30 of a fuel tank 32 with a hose 34 according to the present invention.

As can be seen in FIGS. 5 and 6, the filler tube 36 according to the present invention is made of plastic. This filler tube includes a means approximate one end which is engageable in snap fit relationship with the plastic fuel flange 30 which is attached, in the normal manner, to the plastic fuel tank 32. This means includes an annular flange 38 having a flat lipped portion 40 which extends transverse to the longitudinal axis of the filler tube 36. When assembled, the flange 38 of the filler tube slides by a radially inwardly directed annular flange 42, and snaps together thereby substantially preventing the removal of the filler tube 36.

The fuel flange 30, as shown in FIG. 6, includes a first end portion 44 having means for connecting the fuel flange 30 to the tank 32. Specifically, these means can include circular feet 46 well known in the art. The fuel flange 30 also includes a substantially cylindrical section 48 attached to the first end portion 44 for receiving the hose 50 thereon which can be clamped via clamping mechanism 52 also well known in the art. Attached to the cylindrical section 48 is second end portion 54 having an outer diameter greater than the outer diameter of the cylindrical portion 48, thereby assisting the clamping of the hose 50. The second end portion 54 also includes a recessed abutment surface 56 for receiving the radial flange 58 on one end of the filler tube 36. This flange 58 prevents further axial movement of the filler tube 36 towards the fuel tank 32.

Since the filler tube is made of plastic, preferably, polyethylene and more preferably an ultra-high density polyethylene made using injection mold process, the radial flange 58 does not need to contact the hose 50. With the present invention, the hose 50 does not contact the filler tube 36 and, therefore, when the hose 50 is removed it will not remove the filler tube 36 inadvertently.

The present invention also contemplates other mechanisms which will allow a snap-fit relationship between the filler tube 36 and the fuel flange 30. Specifically, the filler tube 36 does not need a continuous annular flange 38. This annular flange 38 could be replaced with a plurality of section of flanges or tabs which then can contact the radially inward flange 42 of the fuel flange 30. Alternatively, the fuel flange 30 could have sections of the radially inward flange 42 be the tabs and the filler tube 36 could contain the continuous annular flange. It is further contemplated that both the filler tube 36 and the fuel flange 30 could have a plurality of tabs dimensioned such that they could be snapped together and substantially prevent the removal of the filler tube from the fuel flange 30.

The present invention also contemplates an arrangement on the filler tube and the fuel flange which will allow an operator to push the filler tube into the fuel flange and twist the filler tube relative to the fuel flange to lock the assembly FIG. 7 illustrates one possible construction of the inner circumference of a fuel flange 60 which has at least two radially inwardly directed tabs 62 and 64 that are dimensioned so that the tabs 66 and 68 on the filler tube will Pass through the spaces between the tabs on the fuel flange. It is then possible to twist the filler tube relative to the fuel flange so that the tabs 66 and 68 travel along ramps 70 and 72 until they twist into the detent position shown in FIG. 7. Further twisting of the tabs 66 and 68 is prevented by stop members 74 and 76 disposed on the tabs 62 and 64. This arrangement prevents the removal of the filler tube from the fuel flange at a later time.

FIG. 7a discloses an alternative connection arrangement for the tabs. This assembly would allow the filler tube to be removed from the fuel flange at a later time. In this arrangement, the fuel flange 80 is provided with at least one radially inwardly directed tab 82 having a stop member 84 attached thereto. The tab 86 of the filler tube is capable of being inserted into the fuel flange 80 and twisted under the tab 82.

It is also possible to delete the radial flange of the filler tube and provide the filler tube and fuel flange with a bayonet type of connection which is also a type of twist and lock arrangement.

In view of this disclosure, many modifications of this invention will be apparent to those skilled in the art. It is intended that all such modifications which fall within the true scope of this invention be included with the terms of the appended claims.

What is claimed is:

1. A fuel flange and filler tube combination, said fuel flange being plastic and comprising:
   a first end portion adaptable to be connected to a fuel tank; and
   a substantially cylindrical section attached to said first end portion and having an annular flange disposed on an inner surface thereof; and
   a second end portion adjacent to said cylindrical section and including a recess having recessed abutment surface for receiving a flanged surface of a radial flange of said filler tube, said second end portion having an outer diameter greater than the outer diameter of said cylindrical section; and said filler tube comprising:

a cylindrical portion disposable inside said fuel flange and having a means for interengaging said annular flange, when said radial flange of said filler tube is received in said recess, thereby substantially preventing relative axial movement between said filler tube and said fuel flange.

2. A fuel flange and filler tube combination as defined in claim 1, wherein said filler tube is plastic.

3. A fuel flange and filler tube combination as defined in claim 1, wherein said means for interengaging includes an outwardly directed radial flange which contacts said annular flange of said fuel flange.

4. A fuel flange and filler tube combination as defined in claim 1, wherein said filler tube is polyethylene.

5. A fuel flange and filler tube combination as defined in claim 1, wherein said first end portion includes circular feet which can bond with a plastic fuel tank.

6. A plastic fuel assembly comprising: a plastic fuel tank having a plastic fuel flange disposed at an opening thereof and a plastic filler tube having a portion disposed in interengagement with said plastic fuel flange, wherein said fuel flange comprises:

a first end portion adaptable to be connected to a fuel tank;

a substantially cylindrical section attached to said first end portion and having an annular flange disposed on an inner surface thereof; and a second end portion adjacent to said cylindrical section having an outer diameter greater than the outer diameter of said cylindrical section and including a recess having recessed abutment surface for receiving a flanged surface of said filler tube; and said filler tube comprising:

a cylindrical portion disposable inside said fuel flange and having a means for interengaging said annular flange when said radial flange of said filler tube is received in said recess.

7. A plastic fuel assembly as defined in claim 6, wherein said means for interengaging includes an outwardly directed radial flange which contacts said annular flange of said fuel flange.

8. A plastic fuel assembly as defined in claim 6, wherein said means for interengaging includes an plurality of tabs disposed on an outer surface of said filler tube.

9. A plastic fuel assembly comprising: a plastic fuel tank having a plastic fuel flange disposed at an opening thereof and a plastic filler tube having a portion disposed in interengagement with said plastic fuel flange, wherein said fuel flange comprises:

a first end portion adaptable to be connected to a fuel tank; and a substantially cylindrical section attached to said first end portion and having an annular flange disposed on an inner surface thereof; and a second end portion adjacent to said cylindrical section and including a recess having a recessed abutment surface for receiving a flanged surface of a radial flange of said filler tube; and a cylindrical portion disposable inside said fuel flange and having a means for interengaging said annular flange when said radial flange of said filler tube is received in said recess, thereby substantially preventing relative axial movement between said filler tube and said fuel flange.

* * * * *